United States Patent [19]
Overhues et al.

[11] Patent Number: 5,112,178
[45] Date of Patent: May 12, 1992

[54] SPRING WASHER FOR SECURING SCREWS, NUTS OR THE LIKE

[75] Inventors: Egon Overhues, Neuenrade; Reiner Krolow, Lüdenscheid, both of Fed. Rep. of Germany

[73] Assignee: Teckentrup GmbH & Co. KG, Herscheid, Fed. Rep. of Germany

[21] Appl. No.: 738,464

[22] Filed: Jul. 31, 1991

[30] Foreign Application Priority Data

Aug. 8, 1990 [DE] Fed. Rep. of Germany ....... 4025146

[51] Int. Cl.⁵ .......................... F16B 43/02; F16F 1/34
[52] U.S. Cl. .................... 411/544; 411/156; 411/916; 267/161
[58] Field of Search .................. 411/10, 11, 155, 156, 411/533, 544, 531, 916; 267/161, 162

[56] References Cited

U.S. PATENT DOCUMENTS

| | | | |
|---|---|---|---|
| 948,326 | 2/1910 | Hesse | 411/155 |
| 1,963,535 | 6/1934 | Trotter | 411/156 |
| 3,332,464 | 7/1967 | Castel | 411/155 |
| 3,631,910 | 1/1972 | Crowther et al. | 411/155 |
| 3,856,066 | 12/1974 | Reynolds | 411/155 |

FOREIGN PATENT DOCUMENTS

| | | |
|---|---|---|
| 1400872 | 5/1970 | Fed. Rep. of Germany . |
| 2061297 | 6/1974 | Fed. Rep. of Germany . |
| 779361 | 4/1935 | France .................... 411/155 |

*Primary Examiner*—Neill R. Wilson
*Attorney, Agent, or Firm*—Peter K. Kontler

[57] ABSTRACT

A washer for securing screws, nuts or the like has substantially ring-shaped inner and outer washer bodies as well as a transitional region between the bodies. Each washer body has a conical surface at the supported side of the washer and the outer body continuously merges into the inner body in the transitional region at the supported side. The transitional region has a smaller cross section than the adjoining parts of the inner and the outer bodies.

13 Claims, 2 Drawing Sheets

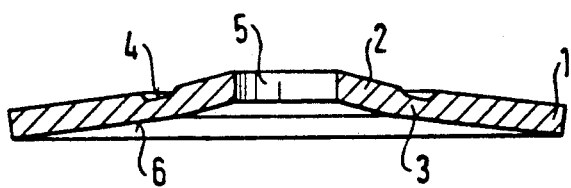
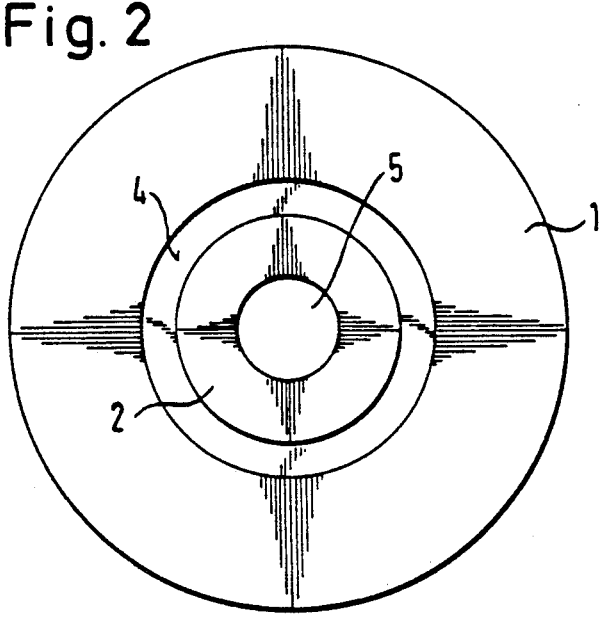
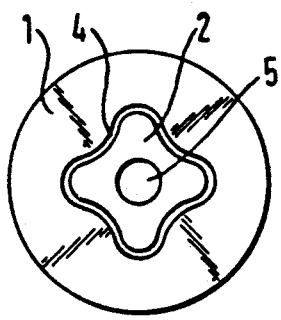 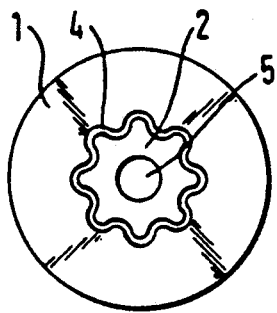 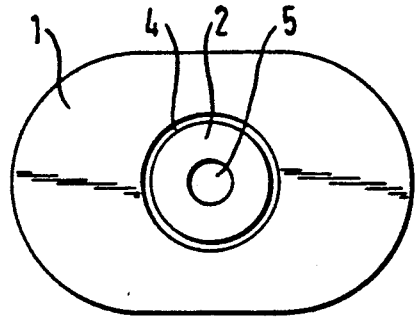

SPRING WASHER FOR SECURING SCREWS, NUTS OR THE LIKE

BACKGROUND OF THE INVENTION

The invention relates to a spring washer for securing screws, nuts or the like, comprising substantially ring-shaped outer and inner washer bodies as well as a transitional region or intermediate section between the inner and outer bodies, the bodies being conical and being open towards the supported side of the washer, and the transitional region having a smaller cross section than the adjoining parts of the inner and the outer washer bodies.

Spring washers serve to counteract loosening of screw joints. Such loosening results from the loss of prestressing forces in the screw joints, and such loss arises as a result of settling and creep in parts being screwed together.

In order to prevent loosening, the spring washers must have a sufficient spring tension across a certain spring deflection which can compensate for loss of the prestressing force, as caused by settling and/or creep, to the extent that is necessary to maintain the clamping force which is required for the operational safety of the screw joint.

For achieving a sufficient spring tension across a certain spring deflection, a great variety of washer constructions have already been suggested. One such construction is disclosed in DE-AS 20 61 297. The transitional region between the washer bodies is formed as a step. In tightening the screw joint, the outer washer body is initially pressed flat against onto the support, on account of which an initial spring tension with a certain spring deflection ensues. With further tightening, the transmission of force results in a very small spring deflection via the relatively stiff step and a relatively high spring tension. On account of the lever action of the step, however, the rim of the outer washer body is lifted off the support in response to further tightening so that the entire load is applied in the vicinity of the step. Accordingly, the region of the support is stressed primarily in this area, which can lead to undesirable damage to the support.

A further spring washer is known from DE-OS 14 00 872. The transitional area between the outer washer body and the inner washer body also consists of a step which substantially leads to the same problems and disadvantages as with the washer according to DE-AS 20 61 297. To prevent loosening of the screw head, this known construction is provided with serrations or corrugations in the region of the inner washer body around the opening for the screw bolt, and the corrugations embed themselves into the material of the screw head to thus produce an additional fastening effect.

In order to avoid damage to the support, it is known to set up an arrangement of a flat, non-resilient washer which lies flat against a support, together with a spring washer which is to be placed above the flat washer. Such an arrangement ensures that the flat washer abuts the support over its entire surface when tightening the screw, while the actual securing effect is achieved by the spring washer. However, the combined height of the washers is considerable and the securing effect is reduced on account of the additional separation line. This known double-washer arrangement also requires a relatively large input of material and leads to assembly problems in arrangements in which a fastening screw is to be mounted jointly with the double-washer arrangement.

OBJECTS OF THE INVENTION

It is an object of the invention to provide a spring washer which securely seats a screw to be tightened without damaging the support, and which is also cheap to manufacture and mount.

SUMMARY OF THE INVENTION

This object is accomplished by the provision of a spring washer of the kind initially mentioned comprising the following features: The improved spring washer has a first or supported side and a second or exposed or upper side and comprises substantially annular inner and outer bodies having substantially conical surfaces at the first side, and a transitional region or intermediate section which is disposed between and merges gradually into each of the two bodies at the first side of the washer. The transitional region has a groove which is disposed between the two bodies at the second side of the washer, and the bodies are deformable from the second side to convert their conical surfaces into substantially flat surfaces each of which can lie flush against a substantially flat support at the first side of the washer.

If the screw joint equipped with a spring washer designed according to the invention is tightened, the peripheral area of the outer washer body is initially pressed at the supported side against the support. As only small spring forces act in this phase, the danger of damage is very slight. In order to further reduce the risk of damage, the outer peripheral area of the outer washer body can be rounded in order to avoid sharp edges.

If the screw is further tightened, the entire surface of the outer washer body contacts the support. If the pressing force is increased further, the inner washer body also begins to engage the support, and the total area of contact with the support increases continuously on account of the continuous gradual transition of the outer washer body into the inner washer body. In addition, the outer edge of the outer washer body is not lifted off the support. On account of this design, in this phase also, only a surface pressure is exerted on the support. In pressing against the support, the load is substantially taken up by the transitional region which on account of its smaller cross section constitutes a hinged area of the washer. After the screw is securely tightened, the entire supported side of the washer abuts the support.

In this case, greater spring tensions arise in the region of inner washer body than in the case of comparable known spring washers. Consequently, in comparison to known washers, the material thickness can be reduced, which positively affects the cost.

An important advantage of the novel spring washer is the magnitude of the spring tension which has up to 20% higher values in comparison to known spring washer constructions. A further important advantage of the novel spring washer is that an up to 80% higher spring deflection can be achieved in comparison to previous constructions. Consequently, washer constructions according to the invention can still achieve excellent values if a release of the load of 20μ prescribed according to German Industrial NORMS is exceeded. Tests have shown that the characteristic loading and releasing curves progress substantially evenly in washer constructions according to the invention so that virtually no hysteresis effects arise.

On account of the unitary construction, a washer according to the invention has a considerably smaller structural height than the known so-called "double-washer" arrangements. Inevitably, when joined together with a screw as one unit, the assembly is also considerably easier.

As the transitional region is formed with a groove at the upper side of the washer next to the adjoining parts of the inner and outer washer bodies, compression of the transitional region can take place in such a way that no forces which are applied to the adjoining parts of the washer bodies must be absorbed.

The groove can be formed in different ways. For example, it can form a circular ring which is concentric with the opening of the inner washer body, through which opening a screw or the like is inserted. It is also possible to provide a groove having the shape of a closed rosette which, for example, has 4 or 8 leaves. Other embodiments of the groove are possible, as long as one ensures that the pressing force when tightening the screw, is absorbed in a suitable manner and that the hinging effect already described is achieved.

While the outline of the inner washer body depends upon the shape of the groove, and also upon the required inner diameter of the opening for the screw to be inserted therethrough, the outline of the outer washer body can be substantially freely selected and adapted to the requirements determined on account of the surroundings. Thus, the outer body can have a polygonal outline to abut stops which are provided for this purpose when tightening the screw, thus preventing that the washer also moves during tightening of the screw. The polygonal outline can be a square outline but it is also conceivable that the outer body resemble a rectangle. It is often desirable that the outer body have a circular or oval outline.

In accordance with a presently preferred embodiment, the conical opening angle of the outer washer body is greater than that of the inner washer body. The effective spring tension can be set by means of the conical opening angle.

The inner washer body can be profiled at the inner peripheral region at the upper side, which is located opposite the supported side, for example, by knurling so that additional security is provided against unscrewing.

BRIEF DESCRIPTION OF THE DRAWING

FIG. 1 is a central sectional view of a spring washer according to the present invention, FIG. 2 is a plan view of the washer according to FIG. 1, FIGS. 7a, 7b and 7c show various further designs of a spring washer according to the present invention.

DESCRIPTION OF PREFERRED EMBODIMENTS

Figure 3:
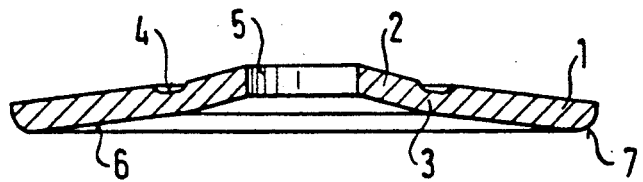
FIG. 3 is a central sectional view of a second washer.

FIG. 1 is a central sectional view of a spring washer which has an outer washer body 1, an inner washer body 2 and a transitional region or intermediate section 3 provided between these. Both washer bodies 1, 2 are a conical and they have conical surfaces at the supported or first side of the washer. The transitional region 3 is smaller in cross section than the respective adjoining parts of the outer 1 and inner washer bodies. Due to such design according to the invention one achieves that the transitional region 3 forms a groove 4 between the adjoining parts of the outer and inner washer bodies. The opening angle of the conical surface of the outer washer body 1 at the supported side is larger than that of the inner washer body 2, i.e. the angle of incidence of the outer washer body 1 to the support is smaller than that of the inner washer body 2. The inner washer body 2 surrounds a central opening 5 through which a screw, a bolt or the like can be inserted.

FIG. 2 is a plan view of the spring washer according to FIG. 1. The inner washer body 2, the groove 4 and the outer washer body 1 are concentrically arranged about the central opening 5.

FIG. 3 shows a further embodiment of the present invention in which the outer peripheral region 7 of the outer washer body 1 is rounded off at the supported side 6. At the initial stage of tightening the screw which is introduced through the opening 5, the outer washer body 1 can therefore so-to-speak roll along the support so that damage is substantially prevented in this region.

Figure 4:
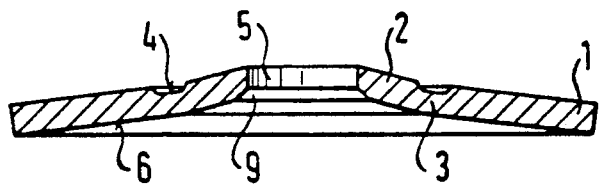
FIG. 4 is a central sectional view of a third washer, FIGS. 5 and 6 respectively show a spring washer according to FIGS. 1 and 2 in a partially tightened condition (FIG. 5) and in a completely tightened condition (FIG. 6)

A third embodiment of the novel washer is depicted in FIG. 4 and corresponds essentially to the embodiment according to FIGS. 1 and 2. However, in order to apply the washer as a so-called combination-part, the central opening 5 is surrounded by a bevel 9 at the side facing the support.

Figure 5:
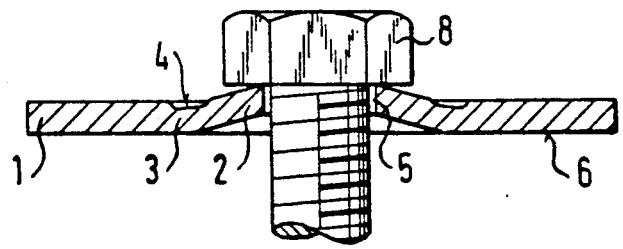
Figure 6:
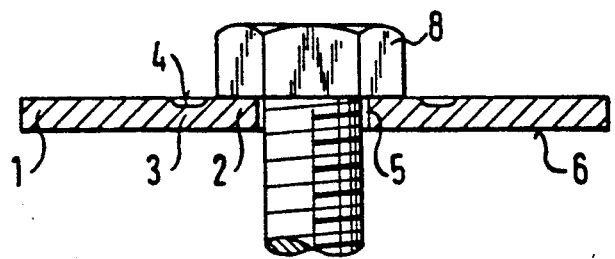

FIGS. 5 and 6 show a spring washer according to the invention in two phases during tightening by means of a screw 8. In the first phase of tightening, the outer washer body 1 is initially pressed from the outer side more and more towards the support until the position shown in FIG. 5 is reached in which the outer washer body 1 lies flush against the conical, while the support surface 6 of the inner washer body 2 is still at an angle to the support.

If the screw 8 is then tightened further, the transitional body 3 is compressed and the inner washer region 2 is increasingly pressed against the support until the phase shown in FIG. 6 is reached. In this phase, the outer washer body 1 as well as the inner washer body 2 lie flush against the support.

FIGS. 7a, 7b and 7c show various further embodiments of the spring washer according to the present invention. In FIG. 7a the groove 4 is rosette-shaped, the rosette having four leaves which are symmetrically arranged about the central opening 5. The outer periphery of the outer washer body 1 is circular, and the dimensions and the shape of the inner washer body 2 are determined by the shape of the groove 4 or of the central opening 5. The same applies for the embodiment according to FIG. 7b in which the groove 4 is formed as a rosette with eight leaves. FIG. 7c shows an embodiment in which the outer washer body 1 is oval. The groove 4 is concentric with the central opening 5.

Further designs of the transitional region are possible, or in connection with this, of the inner and outer washer bodies, which are designed and formed in accordance with the respective purposes of application or the respective conditions.

We claim:

1. A spring washer for securing screws, nuts and the like, said washer having a first side and a second side and comprising substantially annular inner and outer bodies having substantially conical surfaces at said first side, and an intermediate section disposed between and merging gradually into each of said bodies at said first side of the washer, said intermediate section having a groove which is disposed at said second side and said bodies being deformable from said second side to convert said conical surfaces into substantially flat surfaces each of which can lie flush against a substantially flat support at the first side of the washer.

2. The washer of claim 1, wherein each of said bodies has a first cross section at said intermediate section and said intermediate section has a smaller second cross section.

3. The washer of claim 1, wherein said groove has the shape of a closed rosette.

4. The washer of claim 1, wherein said outer body has a rounded peripheral region at said first side.

5. The washer of claim 1, wherein said outer body has a polygonal outline.

6. The washer of claim 1, wherein said outer body has a square or rectangular outline.

7. The washer of claim 1, wherein said outer body has a circular or oval outline.

8. The washer of claim 1, wherein the conical surface of said outer body has a first opening angle and the conical surface of said inner body has a second opening angle in undeformed condition of said bodies.

9. The washer of claim 8, wherein one of said opening angles is larger than the other of said opening angles.

10. The washer of claim 1, wherein said inner body has a substantially centrally located opening and a profiled portion disposed at said second side and surrounding said opening.

11. The washer of claim 1, wherein said inner body has a first thickness and said outer body has a second thickness.

12. The washer of claim 11, wherein said first thickness equals or approximates said second thickness.

13. The washer of claim 1, wherein said inner body has a substantially centrally located opening and a bevel provided at said first side and surrounding said opening.

* * * * *